United States Patent [19]

Holman, Jr.

[11] 4,023,819

[45] May 17, 1977

[54] SPRING-LOADED ADJUSTABLE LENGTH CARGO ROD

[76] Inventor: Robert E. Holman, Jr., 11400 E. Ricks Circle, Dallas, Tex. 75227

[22] Filed: Nov. 11, 1975

[21] Appl. No.: 630,884

[52] U.S. Cl. .................... 280/179 A; 248/354 R
[51] Int. Cl.² .......................................... B60P 7/14
[58] Field of Search ............... 280/179 R, 179 B; 248/356, 354 S; 211/105.6; 105/497, 499, 504

[56] References Cited
UNITED STATES PATENTS

| | | | |
|---|---|---|---|
| 969,002 | 8/1910 | Teachout | 280/179 B |
| 1,073,294 | 9/1913 | Sienert | 248/354 S X |
| 3,090,600 | 5/1963 | Smith | 248/356 X |
| 3,110,506 | 11/1963 | O'Brien | 248/356 X |
| 3,822,850 | 7/1974 | Elias | 248/354 S |
| 3,938,872 | 2/1976 | Hagerman | 211/105.6 |

Primary Examiner—Joseph F. Peters, Jr.
Assistant Examiner—R. Schrecengost
Attorney, Agent, or Firm—Clarence A. O'Brien; Harvey B. Jacobson

[57] ABSTRACT

An adjustable length shoring beam for use in shoring a partial load is provided and includes an elongated tubular center section, a first end section telescopingly engaged with one end of the center section for extension and retraction relative thereto and including latch structure operative to releasably latch the first end section in predetermined extended positions relative to the center section, a second end section telescopingly engaged with the other end of the center section for extension and retraction relative thereto and an abutment member mounted within the tubular center section for shifting therealong with spring structure operably connected between the abutment member and the second end section yieldingly biasing the latter toward a position in predetermined spaced relationship from the abutment member. The shoring beam further includes positioning structure operably connected between the center section and the abutment member for selectively shifting the latter along the center section into engagement with the second end section.

3 Claims, 1 Drawing Figure

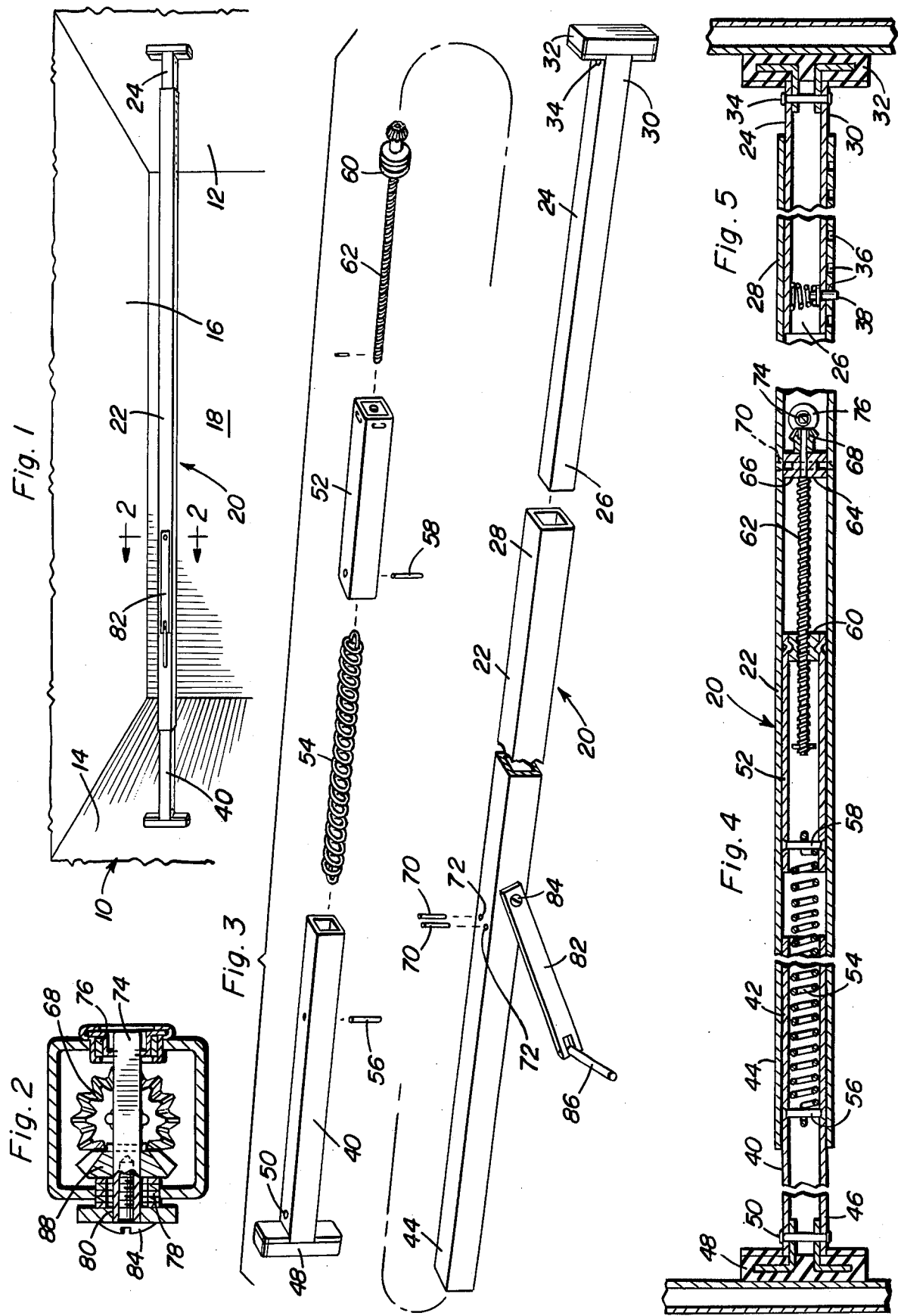

SPRING-LOADED ADJUSTABLE LENGTH CARGO ROD

BACKGROUND OF THE INVENTION

The beam of the instant invention has been primarily designed to provide a structure by which a partial load within a load receptacle such as a truck body may be shored against shifting relative to the body.

Various forms of shoring beams of the same general type have been heretofore provided and one such beam is disclosed in my prior U.S. Pat. No. 3,836,174, dated Sept. 17, 1974. This beam included relatively telescoped sections spring-biased toward extended positions and thus could be readily partially collapsed and placed between opposing load containing walls of a load receptacle for shoring a partial load within the receptacle. However, inasmuch as this previously known type of beam was only spring-biased toward the extended position of use, the free ends of the beam were required to engage supportive brackets or at least include endwise outwardly projecting teeth in order to prevent slippage of the shoring beam relative to the opposing surfaces between which the beam was erected as a result of lateral forces on the shoring beam. Of course, beams of this type provided with endwise outwardly projecting teeth could be used between wood or similar material walls and beams of this type used between metal walls required the use of the aforementioned brackets. Thus, the usefulness of my previously patented beam and other similar beams was limited, at least to some degree.

BRIEF DESCRIPTION OF THE INVENTION

The beam of the instant invention is similar in construction to my above-mentioned previously patented cargo beam, but includes an abutment mounted within the center section thereof and positionable therealong by means of screw jack structure with the abutment being shiftable to a position abutting the inner end of the spring-biased end section of the beam thereby preventing retraction of the spring-biased end section and enabling the use of end members on the opposite ends of the beam usable against both wooden and metal walls.

The main object of this invention is to provide a cargo rod or beam including an extendable and retractable end section spring-biased toward an extended position and which may therefore be readily positioned between cargo retaining walls of a cargo receptacle spaced different distances apart and which also includes structure for selectively preventing retraction of the extendible and retractable end section of the rod.

Another object of this invention, in accordance with the immediately preceding object, is to provide a cargo rod in accordance with the preceding object and including thrust means selectively shiftable longitudinally of the cargo rod into engagement with the inner end of the extendible and retractable end section of the cargo rod.

Another important object of this invention is to provide a cargo rod that may be utilized in a group of similar rods so as to establish a divider between adjacent loads within the same load receptacle.

Still another object of this invention is to provide a cargo rod which may be utilized in sets of rods to define decking joists or beams in order to divide the interior of a load receptacle into a plurality of vertically spaced load receiving compartments.

A final object of this invention to be specifically enumerated herein is to provide a cargo rod in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of the interior of a load receptacle and with the adjustable length cargo rod of the instant invention operably erected between two corresponding portions of opposite side vertical walls of the load receptacle;

FIG. 2 is an enlarged transverse vertical sectional view taken substantially upon the plane indicated by section line 2—2 of FIG. 1;

FIG. 3 is an exploded perspective view of the cargo rod;

FIG. 4 is a longitudinal vertical sectional view of one end portion of the cargo rod; and FIG. 5 is a vertical sectional view of the other end portion of the cargo rod.

DETAILED DESCRIPTION OF THE INVENTION

Referring now more specifically to the drawings, the numeral 10 generally designates a load receptacle including opposite side vertical walls 12 snd 14, an upper wall 16 extending between the upper marginal edge portions of the side walls 12 and 14 and a front wall 18 interconnecting the forward marginal edges of the side walls 12 and 14 and the top wall 16.

The adjustable length cargo rod of the instant invention is referred to in general by the reference numeral 20 and is illustrated in FIG. 1 as being secured between and supported from the opposite side walls 12 and 14. The rod 20 includes a tubular center section 22 of substantially square cross-sectional shape and a first tubular end section 24 which is also substantially square in cross-sectional shape. A first end 26 of the end section 24 is snugly and slidably telescoped within a first end 28 of the center section 22 and the second outer end 30 of the end section 24 has a resilient head 32 secured thereto by means of a suitable fastener 34. In addition, one wall portion of the center section 22 includes a plurality of longitudinally spaced apertures 36 formed therein and the first end section 24 includes a spring-biased retractable locking pin 38 which may be selectively engaged in any one of the apertures 36 in order to retain the end section 24 in adjusted extended position relative to the first end 28 of the center section 22.

The cargo rod 20 further includes a second end section 40 of tubular construction and which also has a generally square cross-sectional shape. The second end section 40 includes a first end 42 snugly and slidably received within the second end 44 of the center section 22 and the second outer end 46 of the second end section 40 includes a head 48 corresponding to the head 32 secured thereto by means of a fastener 50 similar to the fastener 34.

An abutment sleeve 52 is disposed within a central portion of the center section 22 and a compression spring 54 has its opposite ends secured within the adjacent ends of the second end section 40 and the abutment sleeve 52 by means of fasteners 56 and 58. Accordingly, the spring 54 yieldingly biases the second end section 40 toward an extended position relative to the center section 22 and a predetermined spatial relationship relative to the abutment sleeve 52.

The end of the abutment sleeve 52 remote from the second end section 40 includes a nut 60 secured therein against longitudinal shifting relative to the sleeve 52 and one end of a jack screw 62 is threaded through the nut 60. The other end of the jack screw 62 includes a diametrically reduced cylindrical end portion 64 rotatably received through a sleeve block 66 and having a bevel gear 68 mounted thereon. The sleeve block is removably secured in position within the center section 22 by means of a pair of anchor pins 70 removably secured through pairs of registered apertures 72 formed in opposite wall portions of the center section 22 and the abutment sleeve 52 is thereby shiftable longitudinally of the interior of the center section 22 upon rotation of the jaw screw 62.

A square operating shaft 74 extends transversely of and is journaled from the center section 22 by means of bearing structures 76 and 78 and includes one end 80 thereof to which one end of a crank arm 82 is secured by means of a suitable fastener 84, the crank arm 82 including a pivoted handle 86 on its end thereof remote from the fastener 84. In addition, the shaft 74 has a bevel gear 88 mounted thereon and meshed with the bevel gear 68 whereby angular displacement of the exteriorly mounted crank arm 82 will result in rotation of the jack shaft 62 and longitudinal shifting of the abutment sleeve 52 within the center section 22.

When it is desired to install the cargo rod 20 between the side walls 12 and 14, upon the assumption that the crank arm 82 has been turned in order to retract the abutment sleeve 52 away from the terminal end of the second end 44 of the center section 22, the extended position of the first end section 24 according to the approximate distance between the side walls 12 and 14 is adjusted as desired by registering the pin 38 with and allowing the latter to project through a selected aperture 36. Then, the second end section 40 of the cargo rod 20 is retracted against the biasing action of the spring 54 to a position with the over-all length of the rod 20 less than the spacing between the walls 12 and 14. Thereafter, the rod 20 may of course be placed in position between the walls 12 and 14 and the second end section 40 may be released in order that the spring 54 may extend the second section to a position with both of the heads 32 and 48 engaged with the walls 12 and 14.

After the cargo rod 20 has been thus initially positioned and subsequently shifted along the inner surfaces of the walls 12 and 14 to the exact position desired, the crank arm 82 is rotated to cause the abutment sleeve 52 to be shifted longitudinally of the center section toward and into contact with the inner end of the end section 40. The crank arm 82 may even be slightly further rotated in order to cause the end section 40 to be slightly further extended in order to cause tight frictional engagement between the heads 32 and 48 and the inner surfaces of the walls 12 and 14. With the cargo rod 20 thus positioned between the side walls 12 and 14 lateral shfting of the cargo rod 20 relative to the walls 12 and 14 is prevented, even in the case of considerable lateral loads placed upon the cargo rod 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with opposing spaced surfaces, an adjustable length member for shoring a partial load relative to said surfaces, said member including an elongated tubular center section, a first end section telescopingly engaged with one end of said center section for extension and retraction relative to the latter, said first end section and said one end of said center section including coacting latch means operative to releasably latch said first end section in predetermined extended positions relative to said one end of said center section, a second end section telescopingly engaged with the other end of said center section for extension and retraction relative to said center section, and elongated abutment member mounted within said center section for adjustable shifting therealong, spring means operably connected between said abutment member and second end section yieldingly biasing the latter away from said abutment member, positioning means operably connected between said center section and the abutment member for selectively positioning said abutment member along said center section, said abutment member and the adjacent ends of said end sections being slidingly telescoped within said center section against rotation relative thereto, said abutment member being adjustable within said center section to a position abutted against the inner end of said second end section, said positioning means including a block mounted within said center section against displacement relative thereto and disposed between said first end section and said abutment member, a screw shaft having one end journaled through said block against axial shifting relative thereto, said screw shaft extending longitudinally of said center section and having its other end threadedly engaged with the adjacent end of said abutment member, a transverse operating shaft journaled through said second section between said abutment member and said first end section, and meshed beveled gears mounted on said screw shaft and operating shaft.

2. The combination of claim 1 wherein said spring means comprises a compression spring connected between said second end section and said abutment means and enclosed within said center section.

3. The combination of claim 1 including a crank arm mounted on an outer end portion of said operating shaft exteriorly of said center section and disposed at generally right angles relative to said operating shaft, said crank arm having a pivoted handle mounted on its free end swingable between positions disposed at generally right angles relative to said crank arm and generally paralleling and closely overlying said crank arm.

* * * * *